United States Patent
Nagasugi et al.

(10) Patent No.: US 11,258,339 B2
(45) Date of Patent: Feb. 22, 2022

(54) MANUFACTURING METHOD OF IRON CORE PRODUCT

(71) Applicant: MITSUI HIGH-TEC, INC., Fukuoka (JP)

(72) Inventors: Shigeru Nagasugi, Fukuoka (JP); Takashi Fukumoto, Fukuoka (JP); Jin Oda, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 11 days.

(21) Appl. No.: 16/970,535

(22) PCT Filed: Mar. 5, 2019

(86) PCT No.: PCT/JP2019/008662
§ 371 (c)(1),
(2) Date: Aug. 17, 2020

(87) PCT Pub. No.: WO2019/188048
PCT Pub. Date: Oct. 3, 2019

(65) Prior Publication Data
US 2021/0091645 A1  Mar. 25, 2021

(30) Foreign Application Priority Data
Mar. 28, 2018 (JP) .............................. JP2018-062388

(51) Int. Cl.
*H02K 15/02* (2006.01)
*H02K 15/03* (2006.01)
(Continued)

(52) U.S. Cl.
CPC ........... *H02K 15/03* (2013.01); *B23Q 1/0072* (2013.01); *H02K 1/16* (2013.01); *H02K 1/276* (2013.01);
(Continued)

(58) Field of Classification Search
CPC ........... H02K 7/04; H02K 15/03; H02K 1/28; H02K 15/02; H02K 15/165; H02K 15/16; H02K 1/27; Y10T 29/49012
(Continued)

(56) References Cited

U.S. PATENT DOCUMENTS 9,653,975 B2 * 5/2017 Ishimatsu ............... H02K 15/03
9,768,673 B2 * 9/2017 Nagai .................... H02K 15/03
(Continued)

FOREIGN PATENT DOCUMENTS

JP    2011-55687 A    3/2011
JP    2014-138448 A   7/2014
(Continued)

OTHER PUBLICATIONS

Written Opinion issued in International Patent Application No. PCT/JP2019/008662, dated May 7, 2019 and English language translation.
International Search Report issued in International Patent Application No. PCT/JP2019/008662, dated May 7, 2019 and English language translation.

*Primary Examiner* — Thiem D Phan
(74) *Attorney, Agent, or Firm* — Greenblum & Bernstein, P.L.C.

(57) ABSTRACT

A manufacturing method of an iron core product includes: heating an iron core body attached to a jig together with the jig; removing the iron core body from the jig when the jig and the iron core body are heated to denote a first temperature; and separately cooling, after removing the iron core body from the jig, the iron core body and the jig such that the iron core body is at a second temperature lower than the first temperature and the jig is at a third temperature lower than the first temperature.

8 Claims, 9 Drawing Sheets

(51) Int. Cl.
*B23Q 1/00* (2006.01)
*H02K 1/16* (2006.01)
*H02K 1/27* (2022.01)
*H02K 1/28* (2006.01)
*H02K 15/12* (2006.01)

(52) U.S. Cl.
CPC ............ *H02K 1/28* (2013.01); *H02K 15/024* (2013.01); *H02K 15/12* (2013.01); *Y10T 29/49012* (2015.01)

(58) Field of Classification Search
USPC ...... 29/596, 598, 602.1, 604, 607, 609, 729, 29/732
See application file for complete search history.

(56) References Cited

U.S. PATENT DOCUMENTS

| | | |
|---|---|---|
| 2014/0196276 A1 | 7/2014 | Nagai et al. |
| 2015/0206642 A1 | 7/2015 | Nimura et al. |

FOREIGN PATENT DOCUMENTS

| | | |
|---|---|---|
| JP | 2015-6119 A | 1/2015 |
| JP | 2015-139248 | 7/2015 |
| JP | 2017-38505 A | 2/2017 |
| JP | 2017-163703 A | 9/2017 |

\* cited by examiner

MANUFACTURING METHOD OF IRON CORE PRODUCT

TECHNICAL FIELD

The present disclosure relates to a manufacturing method of an iron core product.

BACKGROUND ART

Patent Literature 1 discloses a manufacturing method of a rotor iron core. Specifically, the method includes: preheating an iron core body which will serve as the rotor iron core; fitting a shaft hole of the preheated iron core body into a guide member of a carrier tray to attach the iron core body to the carrier tray; inserting a permanent magnet into a magnet-insert hole of the iron core body placed on the carrier tray; injecting molten resin into the magnet-insert hole that accommodates the permanent magnet after heating the iron core body; separating the iron core body from the carrier tray after cooling the iron core body together with the carrier tray.

CITATION LIST

Patent Literature

[Patent Literature 1] JP2014-138448A

SUMMARY OF INVENTION

Technical Problem

The present disclosure describes a manufacturing method of an iron core product which is capable of manufacturing the iron core product extremely efficiently.

Solution to Problem

According to an illustrative aspect of the present disclosure, a manufacturing method of an iron core product includes: heating an iron core body attached to a jig together with the jig; removing the iron core body from the jig when the jig and the iron core body denote a first temperature by the heating; and separately cooling, after the removing of the iron core body from the jig, the iron core body and the jig such that the iron core body is at a second temperature lower than the first temperature and the jig is at a third temperature lower than the first temperature.

Advantageous Effects of Invention

According to the manufacturing method of the iron core product according to the present disclosure, the iron core product can be manufactured extremely efficiently.

DESCRIPTION OF EMBODIMENTS

Hereinafter, an example of an embodiment according to the present disclosure will be described in more detail with reference to the drawings. In the following description, the same elements or elements having the same functions will be denoted by the same reference numerals, and repetitive descriptions thereof will be omitted.

[Configuration of Rotor Laminated Iron Core]

First, a configuration of a rotor laminated iron core 1 (iron core product) will be described with reference to FIG. 1. The rotor laminated iron core 1 is a part of a rotor. The rotor is formed by attaching an end face plate (not shown) and a shaft to the rotor laminated iron core 1. The rotor is combined with a stator to form a motor. The rotor laminated iron core 1 in the present embodiment is used in an interior permanent magnet type (IPM) motor.

Figure 1:
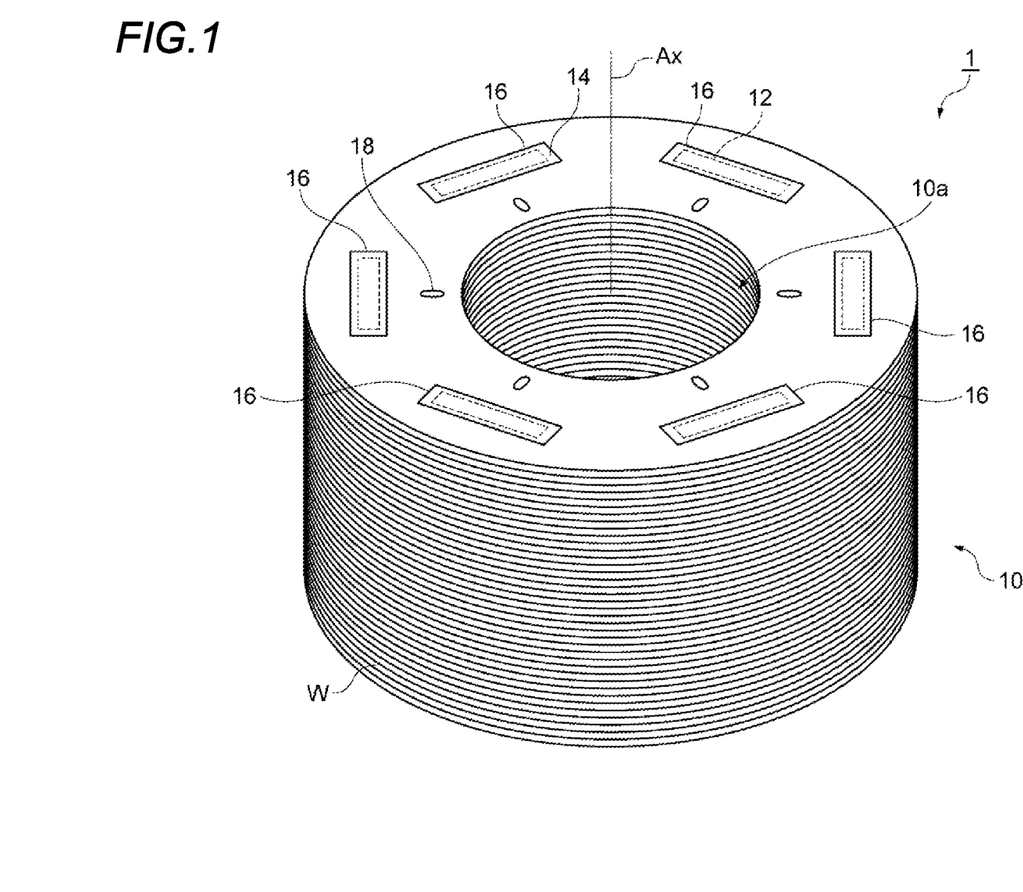
FIG. 1 is a perspective view showing a rotor laminated iron core which is an example of an iron core product.

As shown in FIG. 1, the rotor laminated iron core 1 includes: a laminate 10 (iron core body); a plurality of permanent magnets 12; and a plurality of solidified resins 14.

As shown in FIG. 1, the laminate 10 has a cylindrical shape. An shaft hole 10a (through hole) penetrating the laminate 10 is provided in a central portion of the laminate 10. The shaft hole 10a extends along a central axis Ax. That is, the shaft hole 10a extends in a lamination direction of the laminate 10. The lamination direction may also be referred to as a height direction of the laminate 10 (hereinafter, simply referred to as the "height direction"). In the present embodiment, since the laminate 10 rotates around the central axis Ax, the central axis Ax is also a rotation axis. The shaft (not shown) is inserted into the shaft hole 10a.

A plurality of magnet-insert holes 16 are formed in the laminate 10. The magnet-insert holes 16 are arranged at predetermined intervals along an outer peripheral edge of the laminate 10. The magnet-insert holes 16 penetrate the laminate 10 in a manner of extending along the central axis Ax. That is, the magnet insertion holes 16 extend in the height direction.

In the present embodiment, shapes of the magnet-insert holes 16 are long holes extending along the outer peripheral edge of the laminate 10 when viewed from above. In the present embodiment, the number of the magnet-insert holes 16 is six. The magnet-insert holes 16 are arranged on the same circumference when viewed from above. The positions, shapes, and number of the magnet-insert holes 16 may be changed according to use, required performance, and the like of the motor.

The laminate 10 is configured by laminating a plurality of blanked members W. The blanked members W are plate-like bodies formed by blanking an electromagnetic steel plate ES described below into predetermined shapes, and have shapes corresponding to the laminate 10. The laminate 10 may be configured by so-called rolling lamination. The term "rolling lamination" refers to relatively staggering angles between the blanked members W and laminating a plurality of the blanked members W. The rolling lamination is mainly performed to cancel plate thickness deviation of the blanked members W. The angles of the rolling lamination may be set to any size.

The blanked members W adjacent to each other in the height direction may be interlocked by a caulk portion 18. The blanked members W may also be interlocked to each other by various known methods instead of the caulk portion 18. For example, the plurality of blanked members W may be joined together through using an adhesive or a resin material, or may be joined together by welding. Alternatively, a temporary caulk may be provided on each blanked member W, and the plurality of blanked members W may be interlocked to each other via the temporary caulk to obtain the laminate 10, and then the temporary caulk may be removed from the laminate 10. The term "temporary caulk" refers to a caulk which is used to temporarily integrate the plurality of blanked members W and is removed in a process of manufacturing a product (rotor laminated iron core 1).

As shown in FIG. 1, one permanent magnet 12 is inserted into each magnet-insert hole 16. A shape of the permanent magnet 12 is not particularly limited, and the permanent magnet 12 has a rectangular parallelepiped shape in the present embodiment. A type of the permanent magnet 12 may be determined according to the use, the required performance, and the like of the motor, and may be, for example, a sintered magnet or a bonded magnet.

The solidified resin 14 is obtained by solidifying a molten resin material (molten resin) filled in the magnet-insert hole 16. The filling of the molten resin is performed, for example, after the permanent magnet 12 is inserted into the magnet-insert hole 16. The solidified resin 14 has a function of fixing the permanent magnet 12 in the magnet-insert hole 16 and a function of joining the adjacent blanked members W in the height direction. Examples of the resin material constituting the solidified resin 14 include a thermo setting resin, a thermoplastic resin, or the like. A specific example of the thermo setting resin includes a resin composition including an epoxy resin, a curing initiator, and an additive. Examples of the additive include a filler, a flame retardant, a stress reducing agent, or the like.

[Manufacturing Device of Rotor Laminated Iron Core]

Next, a manufacturing device 100 of the rotor laminated iron core 1 will be described with reference to FIGS. 2 to 6.

Figure 2:
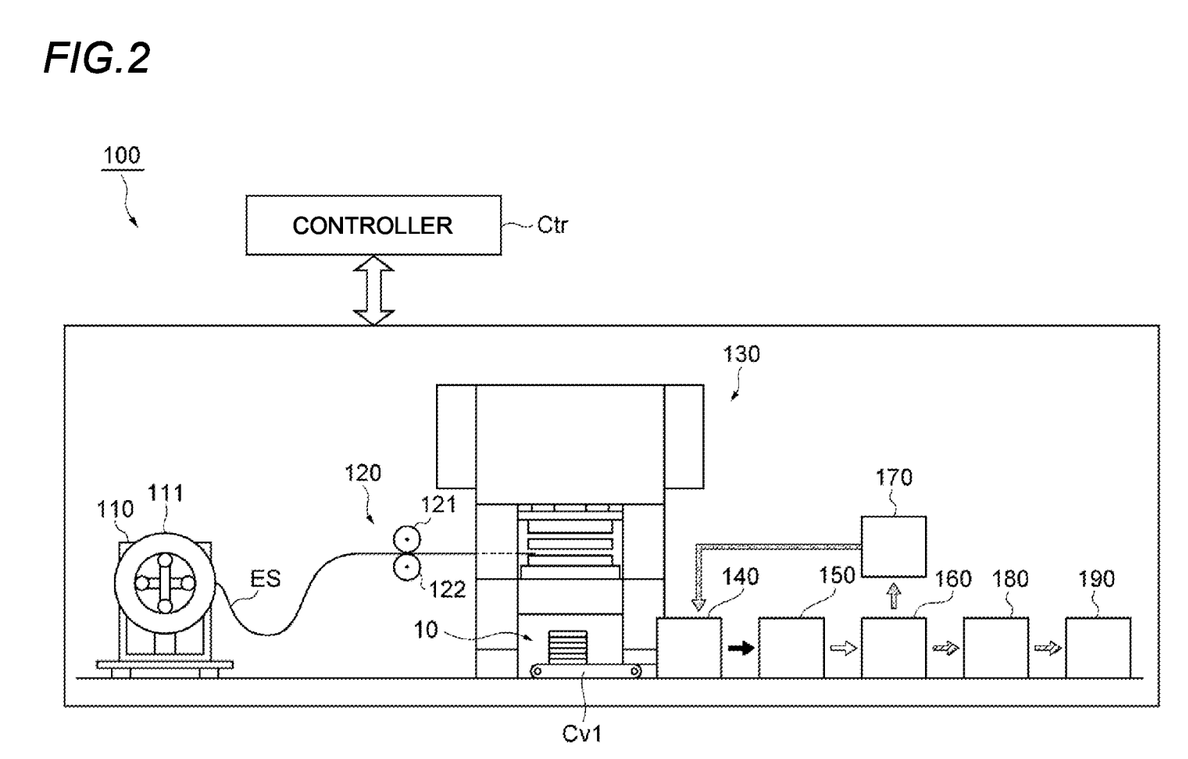
FIG. 2 is a schematic view showing an example of a manufacturing device of the iron core product.

As shown in FIG. 2, the manufacturing device 100 is a device for manufacturing the rotor laminated iron core 1 from an electromagnetic steel plate ES (a plate to be processed) which is a strip-like metal plate. The manufacturing device 100 includes an uncoiler 110, a feeding device 120, a blanking device 130, a jig attachment device 140, a resin injection device 150, a separating device 160, cooling devices 170, 180, a lamination thickness measuring device 190, and a controller Ctr (control unit).

The uncoiler 110 rotatably holds a coil material 111 in a state where the coil material 111 is mounted. The coil material 111 is obtained by winding the strip-shaped electromagnetic steel plate ES into a coil shape. The feeding device 120 includes a pair of rollers 121, 122 sandwiching the electromagnetic steel plate ES from an upper side and a lower side. The pair of rollers 121, 122 rotate and stop based on the instruction signal from the controller Ctr, and intermittently and sequentially feed the electromagnetic steel plate ES toward the blanking device 130.

The blanking device 130 operates based on the instruction signal from the controller Ctr. The blanking device 130 has a function of sequentially blanking the electromagnetic steel plate ES intermittently fed by the feeding device 120 to form the blanked members W, and a function of sequentially laminating the blanked members W obtained by the blanking so as to manufacture the laminate 10.

When the laminate 10 is discharged from the blanking device 130, the laminate 10 is placed on a conveyor Cv1 which extends between the blanking device 130 and the jig attachment device 140. The conveyor Cv1 operates based on the instruction signal from the controller Ctr, and feeds the laminate 10 to the jig attachment device 140.

Figure 3:
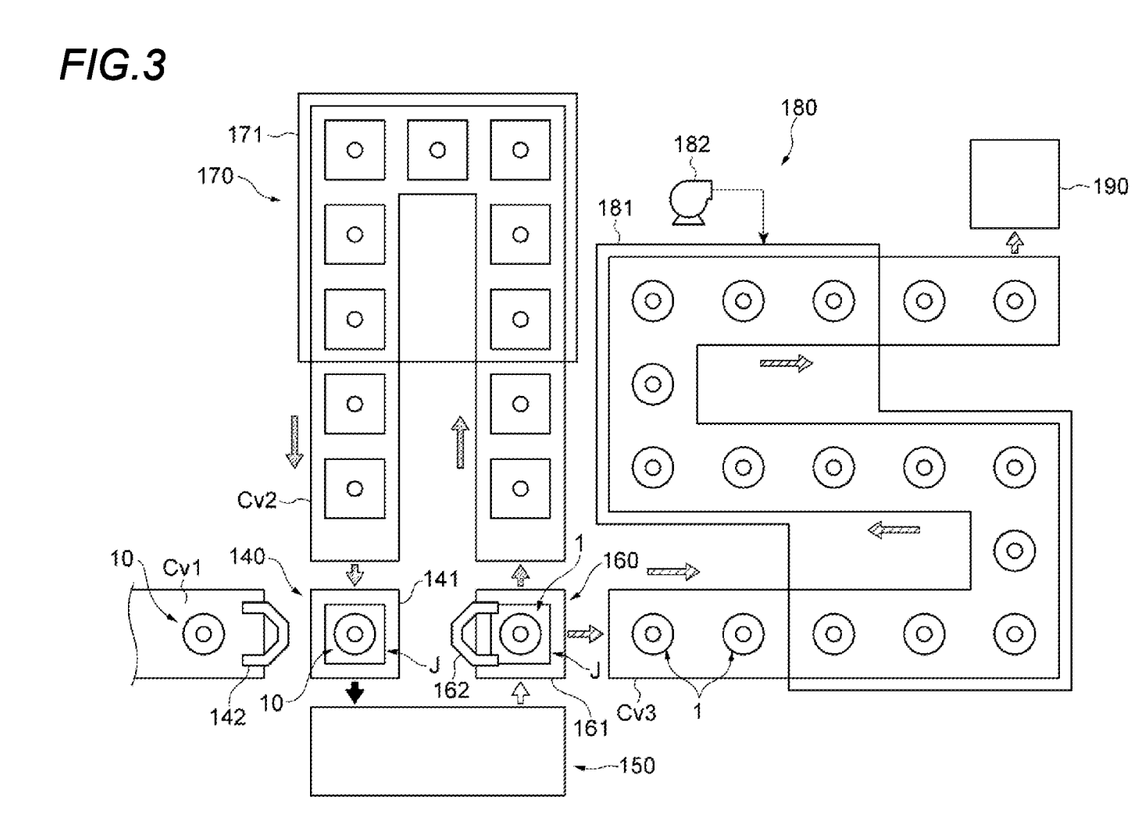
FIG. 3 is a top view schematically showing a downstream side of a blanking device of FIG. 2.

The jig attachment device 140 operates based on the instruction signal from the controller Ctr. The jig attachment device 140 has a function of attaching the laminate 10 to a jig J to be described below. As shown in FIG. 3, the jig attachment device 140 includes a placement table 141 and an attachment mechanism 142.

The placement table 141 is located on the side of a downstream end of the conveyor Cv1 and on the side of a downstream end of a conveyor Cv2 to be described below. The jig J conveyed by the conveyor Cv2 is placed on the placement table 141. The attachment mechanism 142 may be, for example, a robot hand. The attachment mechanism 142 is configured to grip the laminate 10 conveyed to the downstream end of the conveyor Cv1 and attach the laminate 10 to the jig J on the placement table 141.

Figure 4:
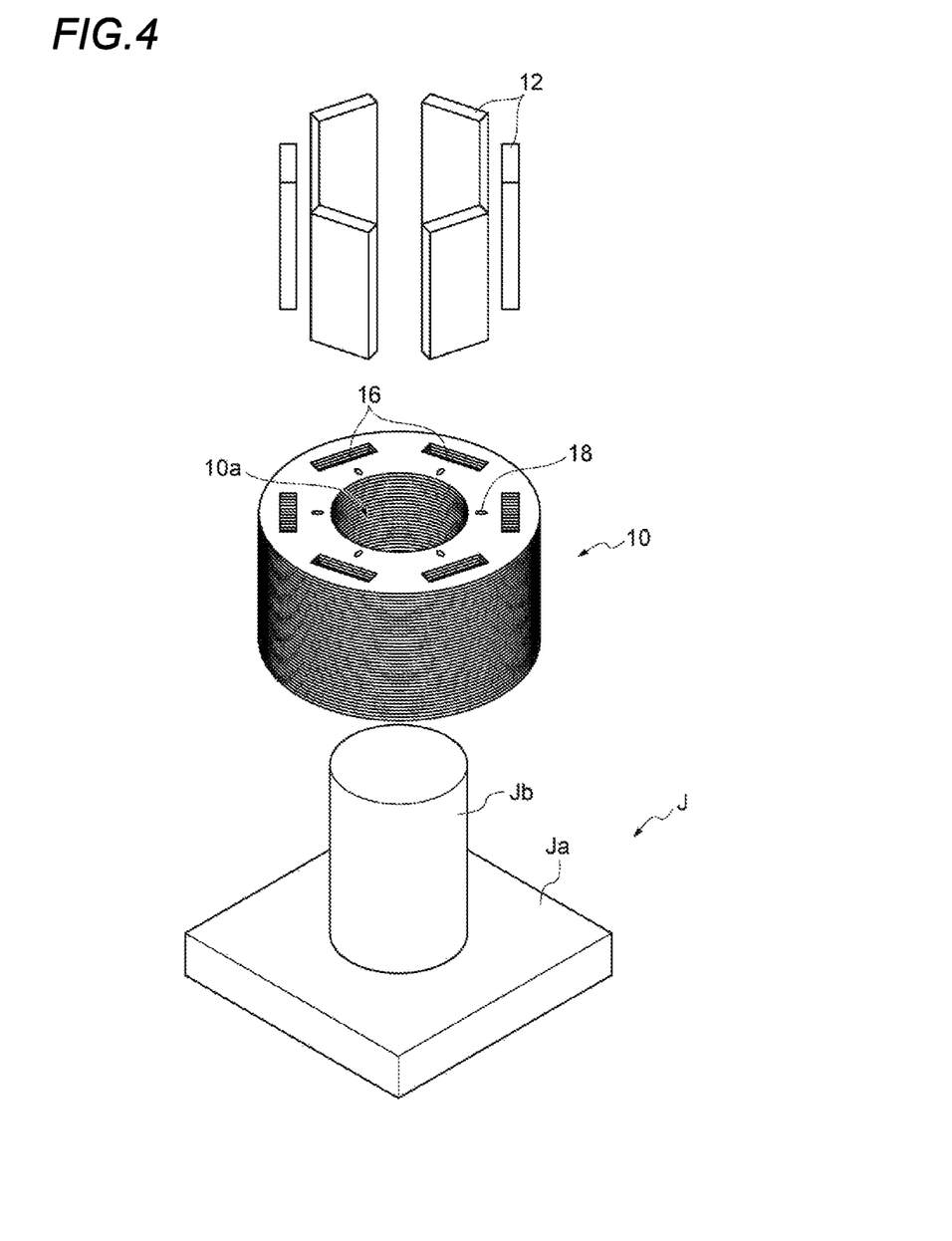
FIG. 4 is a perspective view for showing a state where a laminate is attached to a jig and a state where a permanent magnet is attached to a magnet-insert hole of the laminate.

Here, as shown in FIG. 4, the jig J includes a base Ja and an insertion post Jb (post). The base Ja is a metal plate-like body, and is configured such that the laminate 10 can be placed thereon. The insertion post Jb is a metal columnar body, and extends substantially vertically upward from an upper surface of the base Ja. The insertion post Jb is fixed to the base Ja. An outer diameter of the insertion post Jb may be the same as inner diameter of the shaft hole 10a.

The resin injection device 150 operates based on the instruction signal from the controller Ctr. The resin injection device 150 has a function of inserting the permanent magnet 12 into each magnet-insert hole 16, and a function of filling the molten resin into the magnet-insert hole 16 through which the permanent magnet 12 is inserted. As shown in detail in FIG. 5, the resin injection device 150 includes an upper die 151, a built-in heat source 152 (heating source), and a plurality of plungers 153.

Figure 5:
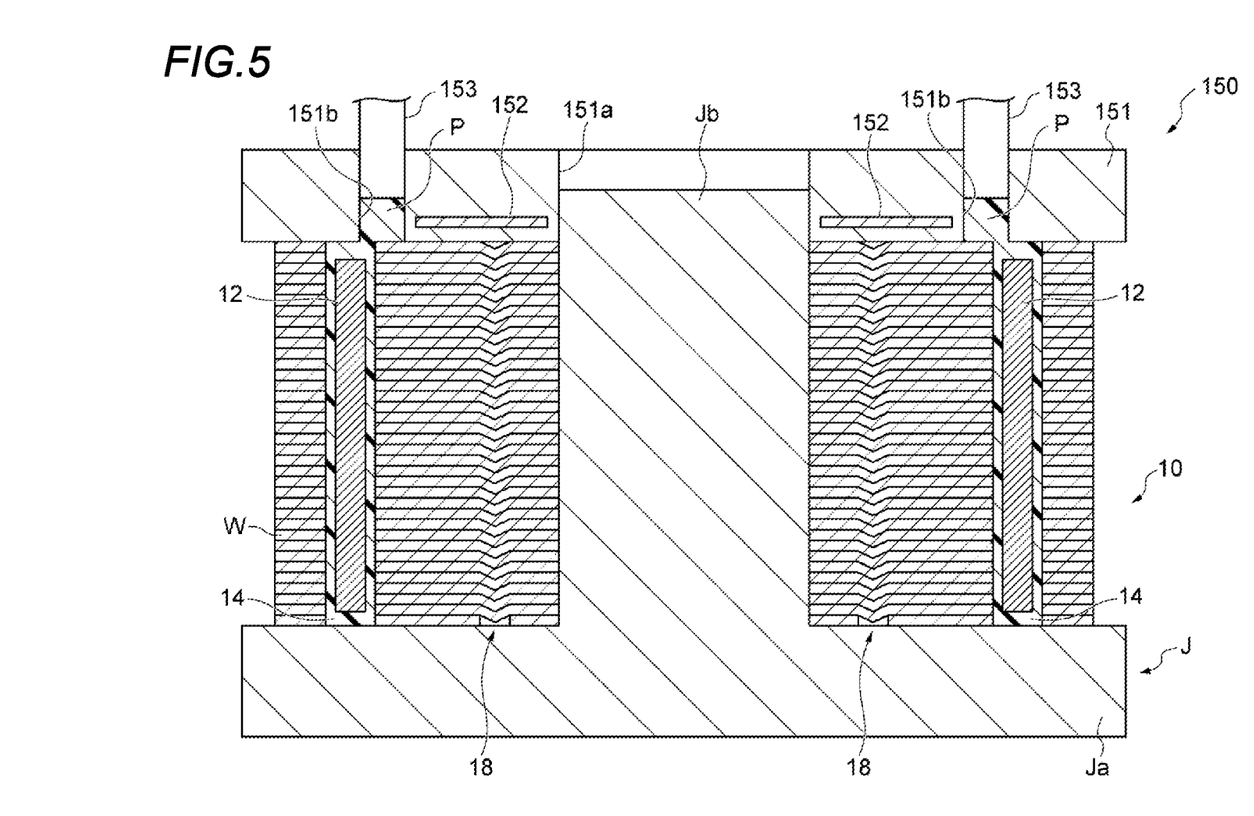
FIG. 5 is a schematic cross-sectional view for showing a state where molten resin is filled in the magnet-insert hole of the laminate by a resin injection device.

The upper die 151 is configured to be capable of clamping the laminate 10 in the height direction together with the base Ja of the jig J. When the upper die 151 and the base Ja clamp the laminate 10 together, a predetermined load is applied to the laminate 10 from the lamination direction.

The upper die 151 is a plate-shaped member having a rectangular shape. The upper die 151 is provided with one through hole 151a and a plurality of accommodation holes 151b. The through hole 151a is located at a substantially central portion of the upper die 151. The through hole 151a has a shape corresponding to the insertion post Jb (substantially circular shape), and the insertion post Jb can be inserted therethrough.

The plurality of accommodation holes 151b penetrate the upper die 151 and are arranged at predetermined intervals along a periphery of the through hole 151a. Each accommodation hole 151b is located at a position corresponding to each magnet-insert hole 16 of the laminate 10 when the base Ja and the upper die 151 clamp the laminate 10. Each accommodation hole 151b has a cylindrical shape and has a function of accommodating at least one resin pellet P therein.

The built-in heat source 152 is, for example, a heater built in the upper die 151. When the built-in heat source 152 operates, the laminate 10 and the jig J are heated via the upper die 151, and the resin pellets P accommodated in the accommodation holes 151b are heated. As a result, the resin pellets P are melted and changed into molten resin.

The plurality of plungers 153 are located above the upper die 151. Each plunger 153 is capable of being inserted into and removed from the corresponding accommodation hole 151b by a driving source (not shown).

The separating device 160 operates based on the instruction signal from the controller Ctr. The separating device 160 has a function of removing the rotor laminated iron core 1, which is attached to the jig J, from the jig J. As shown in FIG. 3, the separating device 160 includes a placement table 161 and a removing mechanism 162.

The rotor laminated iron core 1 attached to the jig J is conveyed from the resin injection device 150 and placed on the placement table 161. The removing mechanism 162 may be, for example, a robot hand. The removing mechanism 162 is configured to grip the laminate 10 on the placement table 161, remove the rotor laminated iron core 1 from the jig J, and transfer the separated jig J and rotor laminated iron core 1 to the sides of upstream ends of conveyors Cv2, Cv3.

The cooling device 170 (second cooling device) operates based on the instruction signal from the controller Ctr. The cooling device 170 has a function of cooling the jig J. As shown in FIG. 3, the cooling device 170 includes a conveyor Cv2 and a cooling chamber 171.

The conveyor Cv2 is configured to convey the jig J from the separating device 160 to the jig attachment device 140. Therefore, the side of the upstream end of the conveyor Cv2 extends toward the separating device 160, and the side of the downstream end of the conveyor Cv2 extends toward the jig attachment device 140.

The cooling chamber 171 is arranged at an intermediate portion of the conveyor Cv2. As shown in detail in FIG. 6, a cooling plate 172 is arranged in the cooling chamber 171. The cooling plate 172 is configured to be movable in an up-down direction and is also configured to allow a refrigerant to flow therein. Meanwhile, in the cooling chamber 171, the conveyor Cv2 is also configured to allow the refrigerant to flow therein. Therefore, when the conveyor Cv2 is stopped while the jig J is intermittently moved by the conveyor Cv2, the jig J is repeatedly clamped between the conveyor Cv2 and the cooling plate 172 in the cooling chamber 171, so that heat exchange is performed between the jig J, the conveyor Cv2, and the cooling plate 172, and the jig J is cooled.

Figure 6:
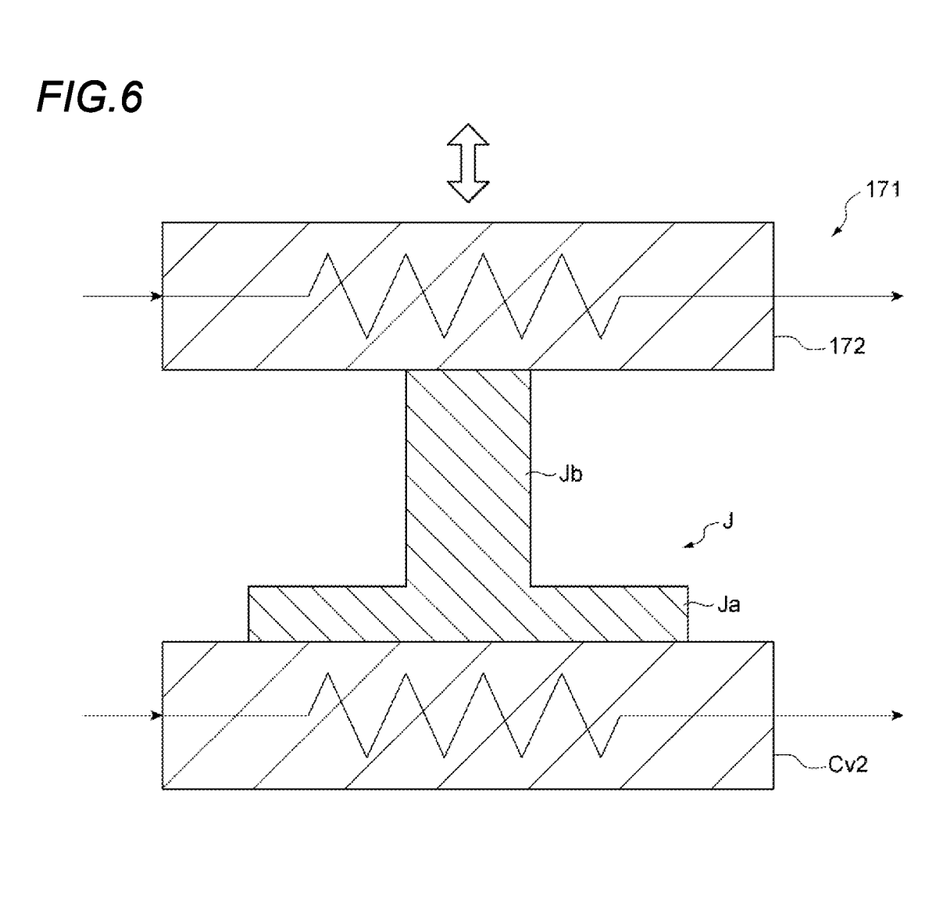
FIG. 6 is a cross-sectional view schematically showing an example of a jig cooling device.

A temperature of the refrigerant flowing in the conveyor Cv2 and the cooling plate 172 may be equal to or lower than a room temperature, and may also be about 10° C. or less, for example. In the present specification, the term "room temperature" refers to a temperature in a range of 15° C. to 35° C.

The cooling device 180 (first cooling device) operates based on the instruction signal from the controller Ctr. The cooling device 180 has a function of cooling the rotor laminated iron core 1. As shown in FIG. 3, the cooling device 180 includes the conveyor Cv3, a cooling chamber 181, and a blower 182.

The conveyor Cv3 is configured to convey the rotor laminated iron core 1 from the separating device 160 to the lamination thickness measuring device 190. Therefore, the side of the upstream end of the conveyor Cv3 extends toward the separating device 160, and the side of the downstream end of the conveyor Cv3 extends toward the lamination thickness measuring device 190.

The cooling chamber 181 is arranged at an intermediate portion of the conveyor Cv3. The blower 182 is connected to the cooling chamber 181 and is configured to feed room temperature air into the cooling chamber 181. Therefore, the rotor laminated iron core 1 conveyed by the conveyor Cv3 in the cooling chamber 181 is subjected to heat exchange with the room temperature air and is thus cooled. Therefore, in the present embodiment, a cooling rate of the jig J by the cooling chamber 171 is set to be greater than a cooling rate of the rotor laminated iron core 1 by the cooling chamber 181.

The lamination thickness measuring device 190 operates based on the instruction signal from the controller Ctr. The lamination thickness measuring device 190 has a function of measuring a lamination thickness of the laminate 10 (a height of the rotor laminated iron core 1). The lamination thickness measuring device 190 is configured to measure the lamination thickness of the laminate 10 in a state where a predetermined load is applied to the laminate 10 from the lamination direction, and to transmit a measurement result thereof to the controller Ctr.

The controller Ctr generates the instruction signal for operating the feeding device 120, the blanking device 130, the jig attachment device 140, the resin injection device 150, the separating device 160, the cooling devices 170, 180 and the lamination thickness measuring device 190 based on, for example, a program recorded in a recording medium (not shown) or operation input from an operator, and transmits the instruction signal to such devices, respectively.

The controller Ctr has a function of determining whether data of the lamination thickness measured by the lamination thickness measuring device 190 is within a standard. When the lamination thickness is within the standard, the controller Ctr determines that the rotor laminated iron core 1 is a non-defective product. As a result, the rotor laminated iron core 1 that satisfies the predetermined standard can be obtained. On the other hand, when the lamination thickness is outside the standard, the controller Ctr determines that the rotor laminated iron core 1 is a defective product. The rotor laminated iron core 1 determined as the defective product is excluded from a manufacturing line.

[Manufacturing Method of Rotor Laminated Iron Core]

Next, a method of manufacturing the rotor laminated iron core 1 will be described with reference to FIGS. 2 to 6. First, the controller Ctr instructs the blanking device 130 to sequentially blank the electromagnetic steel plate ES, and the obtained blanked members W are laminated to form the laminate 10.

Next, the controller Ctr instructs the conveyor Cv1 to convey the laminate 10 toward the jig attachment device 140. Next, in a state where the jig J is placed on the placement table 141, the controller Ctr instructs the attachment mechanism 142 to attach the laminate 10, which is located on the side of the downstream end of the conveyor Cv1, to the jig J. Specifically, the insertion post Jb is fitted into the shaft hole 10a, and the laminate 10 is placed on the base Ja. When the laminate 10 is attached to the jig J, the laminate 10 and the jig J may not be preheated or may be preheated.

Next, the laminate 10 attached to the jig J is conveyed to the resin injection device 150, and the permanent magnet 12 is inserted into each magnet-insert hole 16 as shown in FIG. 4. The insertion of the permanent magnet 12 into each magnet-insert hole 16 may be performed manually or may be performed by a robot hand (not shown) or the like included in the resin injection device 150 based on the instruction signal of the controller Ctr.

Next, as shown in FIG. 5, the upper die 151 is placed on the laminate 10. Thereafter, the laminate 10 is clamped between the base Ja and the upper die 151 from the height direction, and the laminate 10 is pressed by a predetermined load. Next, the resin pellets P are put into each accommodation hole 151b. When the built-in heat source 152 is operated to melt the resin pellets P, the molten resin is injected into each magnet-insert hole 16 by the plunger 153. At this time, the laminate 10 is heated at, for example, about 60° C. to 220° C. by the built-in heat source 152. Thereafter, when the molten resin is solidified, the solidified resin 14 is formed in the magnet-insert hole 16. Therefore, the permanent magnet 12 is attached to the laminate 10 together with the solidified resin 14. When the upper die 520 is removed from the laminate 10, the rotor laminated iron core 1 is completed.

Next, the rotor laminated iron core 1 attached to the jig J is conveyed to the separating device 160 and placed on the placement table 161. Next, the controller Ctr instructs the removing mechanism 162 to remove the rotor laminated iron core 1 from the jig J. Specifically, in a state where the jig J is fixed to the placement table 161, the removing mechanism 162 grips the rotor laminated iron core 1, and pulls up the rotor laminated iron core 1 in the height direction of the insertion post Jb (substantially vertical direction). Since the laminate 10 and the jig J are heated by the built-in heat source 152 in the previous process, a temperature T1 (first temperature) of the rotor laminated iron core 1 and the jig J at the time of separation may be about 60° C. to 200° C., for example.

When the rotor laminated iron core 1 is pulled out from the insertion post Jb, the removing mechanism 162 places the rotor laminated iron core 1 on the side of the upstream end of the conveyor Cv3. Meanwhile, the jig J is placed on the side of the upstream end of the conveyor Cv2 after the rotor laminated iron core 1 is pulled out.

Next, the jig J is conveyed by the conveyor Cv2 and put into the cooling device 170. In the cooling device 170, the jig J is cooled by the conveyor Cv2 and the cooling plate 172. A temperature T2 (third temperature) of the jig J after exiting the cooling device 170 may be lower than the temperature T1, for example, equal to or lower than the room temperature. The cooled jig J is conveyed to the jig attachment device 140 by the conveyor Cv2. That is, the jig J is circulated between the jig attachment device 140, the resin injection device 150, the separating device 160, and the cooling device 170 in such an order.

Meanwhile, the rotor laminated iron core 1 is conveyed by the conveyor Cv3 and put into the cooling device 180. In the cooling device 180, the rotor laminated iron core 1 is cooled by air blown from the blower 182. A temperature T3 (second temperature) of the rotor laminated iron core 1 after exiting the cooling device 180 may be lower than the temperature T1, for example, equal to or lower than the room temperature. The cooled rotor laminated iron core 1 is conveyed to the lamination thickness measuring device 190 by the conveyor Cv3.

Next, the controller Ctr instructs the lamination thickness measuring device 190 to measure the lamination thickness of the laminate 10 (height of the rotor laminated iron core 1). The lamination thickness measuring device 190 transmits the measured data to the controller Ctr. The controller Ctr determines whether the data transmitted from the lamination thickness measuring device 190 is within the predetermined standard. When the controller Ctr determines that the data is outside the standard, the rotor laminated iron core 1 is excluded from the manufacturing line as a defective product. On the other hand, when the controller Ctr determines that the data is within the standard, the rotor laminated iron core 1 which satisfies the standard is obtained.

[Effect]

In the above embodiment, the rotor laminated iron core 1 (laminate 10) and the jig J are separated from each other at the high temperature T1 before the rotor laminated iron core 1 (laminate 10) and the jig J are cooled, and are thereafter cooled separately. Therefore, as compared with an assembly in which the rotor laminated iron core 1 is attached to the jig J, heat capacity of the rotor laminated iron core 1 and the jig J is reduced, and a surface area exposed to outside is increased. Therefore, since the rotor laminated iron core 1 and the jig J are cooled more efficiently, cooling of the rotor laminated iron core 1 and the jig J is completed within a short period of time without rapid-cooling while an influence on dimensions of the rotor laminated iron core 1 and rust generation are prevented. Therefore, the rotor laminated iron core 1 can be manufactured extremely efficiently.

In the above embodiment, the cooling rate when the jig J is cooled from the temperature T1 to the temperature T2 is higher than the cooling rate when the rotor laminated iron core 1 is cooled from the temperature T1 to the temperature T3. Since it may not be necessary to consider the influence on dimensions and rust generation for the jig J as compared with the rotor laminated iron core 1, the cooling of the jig J is completed in a shorter time. Therefore, the rotor laminated iron core 1 can be manufactured with a smaller number of the jigs J. As a result, a manufacturing cost of the rotor laminated iron core 1 can be reduced.

In the above embodiment, the molten resin is injected into the magnet-insert hole 16 in the state where the permanent magnet 12 is inserted while the laminate 10 is heated together with the jig J by the built-in heat source 152 of the resin injection device 150. Therefore, heat applied to the iron core body in the process of injecting the molten resin into the magnet-insert hole 16 is used for heating the laminate 10. Accordingly, it is not necessary to separately prepare a heat source for heating the rotor laminated iron core 1. As a result, a manufacturing cost of the rotor laminated iron core 1 can be reduced.

[Modification]

Although the embodiment according to the present disclosure is described in detail, various modifications may be made to the above-described embodiment without departing from the scope of the claims.

(1) For example, although the laminate 10 in which the plurality of blanked members W are laminated functions as the iron core body in the above embodiment, the iron core body may also be formed of something other than the laminate 10. Specifically, for example, the iron core body may be formed by compression molding ferromagnetic powder, or may be formed by injection molding a resin material containing ferromagnetic powder.

(2) Although the laminate 10 is configured by laminating the plurality of blanked members W in the above embodiment, the laminate 10 may also be configured by stacking a plurality of block bodies in which a plurality of blanked members W are laminated. At this time, the plurality of block bodies may be laminated by rolling lamination.

(3) A magnet set in which two or more permanent magnets 12 are combined may be inserted into each magnet-insert hole 16. In this case, in one magnet-insert hole 16, the plurality of permanent magnets 12 may be arranged in a longitudinal direction of the magnet-insert hole 16. In the one magnet-insert hole 16, the plurality of permanent magnets 12 may also be arranged in an extending direction of the magnet-insert hole 16. In the one magnet-insert hole 16, a plurality of permanent magnets 12 may be arranged in the longitudinal direction while a plurality of permanent magnets 12 may be arranged in the extending direction.

(4) In the above embodiment, the resin pellet P accommodated in the accommodation hole 151b of the upper die 151 is melted by the built-in heat source 152, and the molten resin is injected into the magnet-insert hole 16 into which the permanent magnet 12 is inserted. However, the permanent magnet 12 may also be held in the magnet-insert hole 16 by various other methods. For example, the magnet-insert hole 16 may be filled with resin by heating the laminate 10 in a state where the permanent magnet 12 and the resin pellet P are inserted into the magnet-insert hole 16 and melting the resin pellet P therein. Moreover, for example, the magnet-insert hole 16 may be filled with resin by inserting the heated permanent magnet 12 into the magnet-insert hole 16 in a state where the resin pellet P is inserted into the magnet-insert hole 16 and melting the resin pellet P by heat of the permanent magnet 12.

(5) The conveyance of the assembly of the jig J and the laminate 10 from the jig attachment device 140 to the resin injection device 150 may be manually performed, may be performed by the attachment mechanism 142 based on the instruction signal from the controller Ctr, or may be performed by another conveyance mechanism included in the manufacturing device 100 (for example, a robot hand) based on the instruction signal from the controller Ctr. The conveyance of the laminate 10 from the conveyor Cv1 to the jig attachment device 140, the conveyance of the assembly of the jig J and the rotor laminated iron core 1 from the resin injection device 150 to the separating device 160, the conveyance of the jig J from the separating device 160 to the conveyor Cv2, the conveyance of the rotor laminated iron core 1 from the separating device 160 to the conveyor Cv3 and the conveyance of the rotor laminated iron core 1 from the conveyor Cv3 to the lamination thickness measuring device 190 may similarly be manually performed or performed by the conveyance mechanism included in the manufacturing device 100.

(6) Although the laminate 10 and the jig J are heated by the built-in heat source 152 of the resin injection device 150 in the above embodiment, other heating sources may also be used to heat the laminate 10 (the rotor laminated iron core 1) and the jig J. For example, in a case where temperatures of the laminate 10 and the jig J decrease after a certain period of time elapses after being heated by the built-in heat source 152 of the resin injection device 150, the laminate 10 (the rotor laminated iron core 1) and the jig J may be reheated by another heating source.

(7) When the rotor laminated iron core 1 and the jig J are at the temperature T1, an inner diameter of the shaft hole 10a of the rotor laminated iron core 1 may be larger than an outer diameter of the insertion post Jb, and the insertion post Jb may be spaced apart from the shaft hole 10a. In this case, the rotor laminated iron core 1 and the jig J are separated at the temperature T1 before the insertion post Jb fits into the shaft hole 10a along with cooling which makes it difficult to pull out the rotor laminated core 1 from the insertion post Jb. Therefore, the rotor laminated iron core 1 can be removed from the jig more easily.

(8) A coefficient of thermal expansion of the rotor laminated iron core 1 may be larger than a coefficient of thermal expansion of the jig J. In this case, when the rotor laminated iron core 1 and the jig J are at the temperature T1, a gap is likely to be formed between the insertion post Jb and the rotor laminated iron core 1. Therefore, it is possible to easily separate the rotor laminated iron core 1 and the jig J in a heating state.

(9) Although the rotor laminated iron core 1 has been described in the above embodiment, the scope of claims and the gist thereof may also be applied to a stator laminated iron core (iron core product). In this case, the stator laminated iron core may be a split stator laminated iron core in which a plurality of iron core pieces are combined or a non-split stator laminated iron core.

Figure 7:
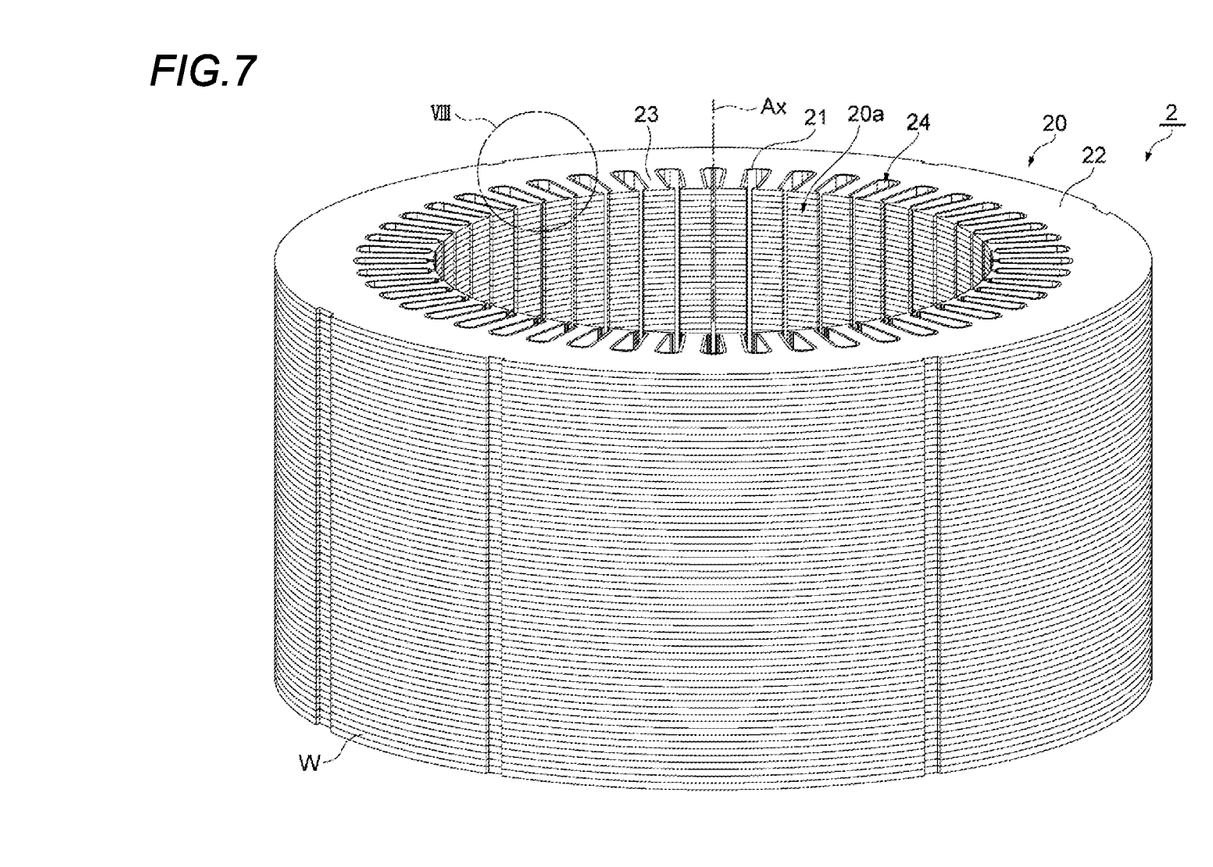
FIG. 7 is a perspective view showing a stator laminated iron core as another example of the iron core product.
Figure 8A:
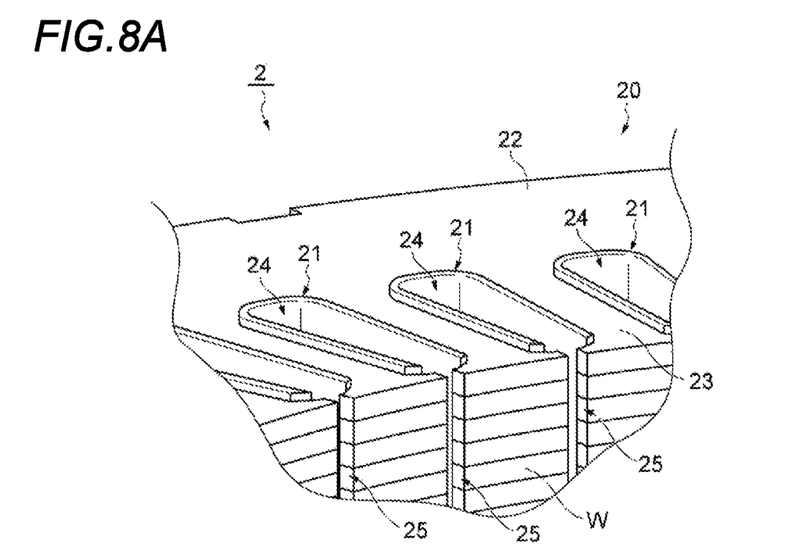
FIG. 8A is an enlarged perspective view of portion VIII of FIG. 7.
Figure 8B:
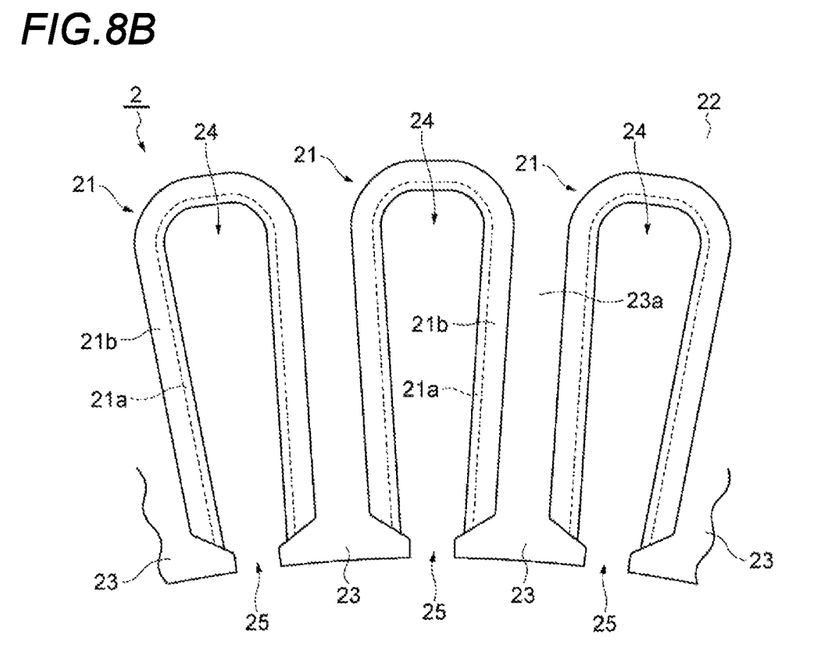
FIG. 8B is an enlarged top view on the vicinity of a teeth portion of FIG. 8A.

Here, an example of a stator laminated iron core 2 will be described with reference to FIGS. 7 and 8. The stator laminated iron core 2 is a part of a stator. The stator is a stator in which a winding is attached to the stator laminated iron core 2. The stator is combined with a rotor to form a motor.

The stator laminated iron core 2 includes a laminate 20 (iron core body) and a plurality of resin portions 21. The laminate 20 has a cylindrical shape. That is, a through hole 20a which extends along the central axis Ax is provided in a central portion of the laminate 20. A rotor can be arranged in the through hole 20a.

The laminate 20 is configured by laminating a plurality of blanked members W. The laminate 20 includes a yoke portion 22 and a plurality of teeth portions 23. The yoke portion 22 has an annular shape and extends so as to surround the central axis Ax. A width of the yoke portion 22 in a radial direction thereof (hereinafter, simply referred to as the "radial direction"), an inner diameter, an outer diameter, and a thickness can be set to various sizes according to application and performance of the motor.

Each teeth portion 23 extends in the radial direction (a direction intersecting the yoke portion 22) so as to extend from an inner edge of the yoke portion 22 toward the side of the central axis Ax. That is, each teeth portion 23 protrudes from the inner edge of the yoke portion 22 toward the side of the central axis Ax. The teeth portions 23 are arranged at substantially equal intervals in a circumferential direction. A slot 24 which is a space for arranging the winding (not shown) is defined between the adjacent teeth portions 23. A slit-shaped opening (slot opening) 25 which extends in the height direction is defined between tip end portions of the teeth portions 23 adjacent to each other in the circumferential direction. The opening 25 communicates with the slot 24.

Each of the plurality of resin portions 21 is provided in each of the slots 24. Specifically, as shown in FIG. 8, the resin portion 21 includes a main portion 21a and an end portion 21b. The main portion 21a covers an inner wall surface of the slot 24 located on an inner side of a tip end portion of the slot 24 (the side of the yoke portion 22).

The end portion 21b is provided integrally with an upper end and an lower end of the main portion 21a in the height direction, and extends from the inner wall surface of the slot 24 to wrap around an upper end surface and a lower end surface of the laminate 20. The end portion 21b protrudes outward from the upper end surface and the lower end surface of the laminate 20 in the height direction, and partially covers the respective end surfaces.

Figure 9:
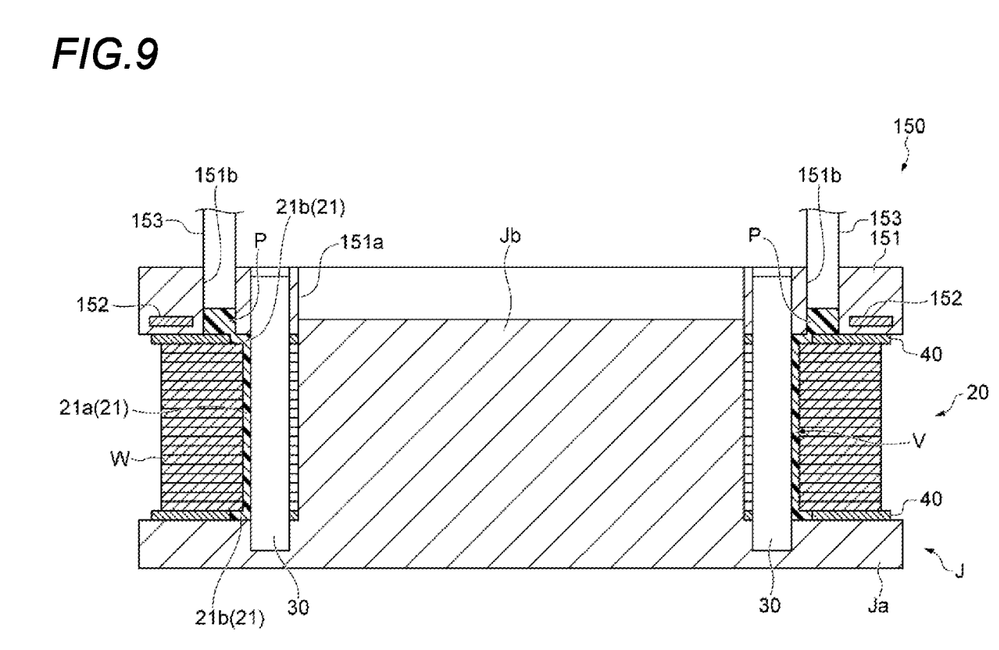
FIG. 9 is a schematic cross-sectional view for showing a state where molten resin is filled in an injection space between a core member and a slot by the resin injection device.

Next, the manufacturing device 100 of the stator laminated iron core 2 will be described. Since the manufacturing device 100 of the stator laminated iron core 2 is the same as the manufacturing device 100 of the rotor laminated iron core 1 except for the jig J and the resin injection device 150, the jig J and the resin injection device 150 will be mainly described below.

As shown in FIG. 9, the jig J includes the base Ja, the insertion post Jb, and a plurality of cores 30. The plurality of cores 30 has an outer shape corresponding to the slot 24. The outer shape of the core 30 is slightly smaller than the slot 24. The plurality of cores 30 are detachably attached to the base Ja. The plurality of cores 30 are arranged in a circular shape at substantially equal intervals so as to surround the insertion post Jb, and overlap with the corresponding slots 24 when the laminate 20 is attached to the jig J.

The resin injection device 150 has a function of filling a filling space V with molten resin and connecting the blanked members W constituting the laminate 20 with each other. As shown in FIG. 9, the resin injection device 150 includes a pair of overflow plates 40 and an upper die 151.

Each overflow plate 40 (hereinafter, simply referred to as the "plate 40") is a thin plate having an annular shape. The plate 40 is provided with one through hole having an outer diameter corresponding to the insertion post Jb of the jig J and a plurality of through holes having an outer diameter corresponding to each core 30.

Next, a method of manufacturing the stator laminated iron core 2 will be described with reference to FIG. 9. First, the controller Ctr instructs the blanking device 130 to form the laminate 20.

Next, the controller Ctr instructs the conveyor Cv1 to convey the laminate 20 toward the jig attachment device 140. Next, in a state where the jig J is placed on the placement table 141, the controller Ctr instructs the attachment mechanism 142 to attach the laminate 20, which is located on the side of downstream ends of the pair of plates 40 and the conveyor Cv1, to the jig J. Specifically, the plate 40, the laminate 20, and the plate 40 are attached to the jig J in such an order. When the laminate 20 is attached to the jig J, the plurality of cores 30 are inserted into the corresponding slots 24 to place the laminate 20 on the base Ja while the insertion post Jb is fitted into the through hole 20a in a state where the plurality of cores 30 are attached to the base Ja.

Next, the laminate 20 attached to the jig J is conveyed to the resin injection device 150, and the upper die 151 is placed on the laminate 20 as shown in FIG. 9. Thereafter, the laminate 20 is clamped between the base Ja and the upper die 151 from the height direction, and the laminate 20 is pressed by a predetermined load. Next, the resin pellets P are put into each accommodation hole 151b. When the built-in heat source 152 is operated to melt the resin pellets P, the molten resin is injected into the filling space V by the plunger 153. Thereafter, when the molten resin is solidified, the resin portion 21 is formed in the filling space V. In this way, the resin portion 21 is formed on the laminate 20. When the upper die 151 and the pair of plates 40 are removed from the laminate 20, the stator laminated iron core 2 is completed. Thereafter, similarly to the manufacturing device 100 of the rotor laminated iron core 1, the stator laminated iron core 2 and the jig J including the cores 30 are separately cooled, and a lamination thickness of the cooled stator laminated iron core 2 is measured to obtain the stator laminated iron core 2 which satisfies the standard.

In this way, heat applied to the laminate 20 in the process of forming the resin portion 21 on an inner peripheral surface of the slot 24 is used to heat the laminate 20. Therefore, it is not necessary to separately prepare a heat source for heating the laminate 20. Accordingly, a manufacturing cost of the stator laminated iron core 2 can be reduced.

EXAMPLE

Example 1. The manufacturing method of the iron core product (1, 2) according to one example of the present disclosure includes: heating the iron core body (10, 20), which is attached to the jig (J), together with the jig (J); removing the iron core body (10, 20) from the jig (J) when the jig (J) and the iron core body (10, 20) show the first temperature (T1) due to the heating; and separately cooling the iron core body (10, 20) and the jig (J) such that the iron core body (10, 20) is at the second temperature (T3) which is lower than the first temperature (T1) while the jig (J) is at the third temperature (T2) which is lower than the first temperature (T1) after the iron core body (10, 20) is removed from the jig (J).

According to Patent Literature 1, after the iron core body is cooled together with the carrier tray, the iron core body is separated from the carrier tray. Therefore, heat capacity of the iron core body and the carrier tray as a whole is large, and it takes time to cool. It is also conceivable to rapidly cool the iron core body and the carrier tray to shorten the cooling time. However, distortion occurs in the iron core body along with the rapid cooling, which may affect dimensions of the iron core body. In addition, condensation may occur on a surface of the iron core body along with the rapid cooling, which may lead to rust. So it is difficult to shorten the cooling time by the rapid cooling.

In contrast, according to the method of Example 1, the iron core body (10, 20) and the jig (J) are separated in a high temperature state (first temperature T1) before the iron core body (10, 20) and the jig (J) are cooled, and are thereafter cooled separately. Therefore, as compared with an assembly in which the iron core body (10, 20) is attached to the jig (J), heat capacity of the iron core body (10, 20) and the jig (J) is reduced, and a surface area exposed to outside is increased. Accordingly, since the iron core body (10, 20) and the jig (J) are cooled more efficiently, the cooling of the iron core body (10, 20) and the jig (J) is completed within a short period of time without rapid-cooling while an influence on dimensions of the iron core product (1) and rust generation are prevented. As a result, the iron core product (1, 2) can be manufactured extremely efficiently.

Example 2. In the method of Example 1, the cooling rate when the jig (J) is cooled from the first temperature (T1) to the third temperature (T2) is higher than the cooling rate when the iron core body (10, 20) is cooled from the first temperature (T1) to the second temperature (T3). It may not be necessary to consider the influence on dimensions and rust generation for the jig (J) as compared with the iron core body (10, 20). Therefore, according to the method of Example 2, the cooling of the jig (J) is completed in a shorter time. Therefore, the iron core product (1, 2) can be manufactured with a smaller number of the jigs (J). As a result, a manufacturing cost of the iron core product (1, 2) can be reduced.

Example 3. In the method of Example 1 or 2, the first temperature (T1) is 60° C. to 200° C., and the second and third temperatures (T2, T3) are equal to or less than the room temperature.

Example 4. In the method of any one of Examples 1 to 3, the iron core body (10, 20) is provided with the through hole (10a, 20a) which penetrates the iron core body (10, 20) in the height direction. The jig (J) includes: the base (Ja); and the post (Jb) extending upward from the base (Ja). The heating of the iron core body (10, 20) together with the jig (J) includes: placing the iron core body (10, 20) on the base (Ja) in a state where the post (Jb) is inserted in the through hole (10a, 20a).

Example 5. In the method of Example 4, the post (Jb) located in the through hole (10a, 20a) is spaced apart from the iron core body (10, 20) when the iron core body (10, 20) and the jig (J) are at the first temperature (T1), and the outer shape of the post (Jb) is larger than the space in the through hole (10a, 20a) when the iron core body (10, 20) and the jig (J) are at the second temperature (T3) and the third temperature (T2) respectively. In this case, the iron core body (10, 20) and the jig (J) are separated at the first temperature (T1) before the insertion post (Jb) fits into the through hole (10a, 20a) along with cooling which makes it difficult to pull out the iron core body (10, 20) from the post (Jb). Therefore, the iron core body (10, 20) can be removed from the jig (J) more easily.

Example 6. In the method of any one of Examples 1 to 5, the iron core body (10) is provided with the magnet-insert hole (16) which penetrates the iron core body (10) in the height direction. The heating of the iron core body (10) together with the jig (J) includes: injecting molten resin into the magnet-insert hole (16) in a state where the permanent magnet (12) is inserted therein while heating the iron core body (10) together with the jig (J) by the heating source (152). In this case, heat applied to the iron core body (10) in the process of injecting the molten resin into the magnet-insert hole (16) is used for heating the iron core body (10). Therefore, it is not necessary to separately prepare a heat source for heating the iron core body (10). Accordingly, the manufacturing cost of the iron core product (rotor iron core 1) can be reduced.

Example 7. In the method of any one of Examples 1 to 5, the iron core body (20) includes: the annular yoke portion (22); and the plurality of teeth portions (23) extending from the yoke portion (22) in a manner of intersecting the yoke portion (22). The slot (24) is provided between two teeth portions (23) adjacent to each other in the circumferential direction of the yoke portion (22). The jig (J) includes: the core (30) which has an outer shape corresponding to the slot (24). The heating of the iron core body (20) together with the jig (J) includes: injecting molten resin into the injection space (V) between the slot (24) and the core (30) while heating the iron core body (20) together with the jig (J) by the heating source (152) in a state where the core (30) is inserted in the slot (24). In this case, the heat applied to the iron core body (20) in the process of forming the resin on the inner peripheral surface of the slot (24) is used to heat the iron core body (20). Therefore, it is not necessary to separately prepare a heat source for heating the iron core body (20). Accordingly, the manufacturing cost of the iron core product (stator iron core 2) can be reduced.

Example 8. In the method of any one of Examples 1 to 7, the coefficient of thermal expansion of the iron core body (10, 20) may be larger than the coefficient of thermal expansion of the jig (J). In this case, when the iron core body (10, 20) and the jig (J) are at the first temperature (T1), a gap is likely to be formed between the post (Jb) and the iron core body (10, 20). Therefore, it is possible to easily separate the iron core body (10, 20) and the jig (J) in a heating state.

The present application is based on JP2018-062388A filed on Mar. 28, 2018, contents of which are incorporated herein as reference.

INDUSTRIAL APPLICABILITY

According to the manufacturing method of the iron core product according to the present disclosure, the iron core product can be manufactured extremely efficiently.

REFERENCE SIGNS LIST

1 . . . rotor laminated iron core (iron core product), 10 . . . laminate (iron core body), 10a . . . shaft hole (through hole), 12 . . . permanent magnet, 14 . . . solidified resin, 2 . . . stator laminated iron core (iron core product), 20 . . . laminate (iron core body), 20a . . . through hole, 21 . . . resin portion, 22 . . . yoke portion, 23 . . . teeth portion, 24 . . . slot, 30 . . . core, 100 . . . manufacturing device, 130 . . . blanking device, 140 . . . jig attachment device, 150 . . . resin injection device, 152 . . . built-in heat source (heating source), 160 . . . separating device, 170 . . . cooling device (second cooling device), 180 . . . cooling device (first cooling device), Ctr . . . controller (control unit), J . . . jig, Ja . . . base, Jb . . . insertion post (post).

The invention claimed is:

1. A manufacturing method of an iron core product, comprising:
heating an iron core body attached to a jig together with the jig;
removing the iron core body from the jig when the jig and the iron core body denote a first temperature by the heating; and
separately cooling, after the removing of the iron core body from the jig, the iron core body and the jig such that the iron core body is at a second temperature lower than the first temperature and the jig is at a third temperature lower than the first temperature.

2. The manufacturing method according to claim 1, wherein a cooling rate when the jig is cooled from the first temperature to the third temperature is higher than a cooling rate when the iron core body is cooled from the first temperature to the second temperature.

3. The manufacturing method according to claim 1, wherein the first temperature is within a range of 60° C. to 200° C., and the second temperature and third temperature are equal to or less than a room temperature.

4. The manufacturing method according to claim 1, wherein the iron core body is provided with a through hole penetrating the iron core body in a height direction,
the jig includes: a base; and a post extending upward from the base, and
the heating of the iron core body together with the jig includes: placing the iron core body on the base in a state where the post is inserted in the through hole.

5. The manufacturing method according to claim 4, wherein the post located inside the through hole is spaced apart from the iron core body when the iron core body and the jig are at the first temperature, and
an outer shape of the post is larger than a space inside the through hole when the iron core body and the jig are at the second temperature and the third temperature respectively.

6. The manufacturing method according to claim 1, wherein the iron core body is provided with a magnet-insert hole penetrating the iron core body in the height direction, and
the heating of the iron core body together with the jig includes: injecting molten resin into the magnet-insert hole in a state where a permanent magnet is inserted in the magnet-insert hole during the heating of the iron core body together with the jig by a heating source.

7. The manufacturing method according to claim 1, wherein the iron core body includes: an annular yoke portion; and a plurality of teeth portions extending from the yoke portion to intersect with the yoke portion,
- a slot is provided between two teeth portions of the plurality of the teeth portions, the two teeth portions being adjacent to each other in a circumferential direction of the yoke portion,
- the jig includes: a core having an outer shape corresponding to the slot, and
- the heating of the iron core body together with the jig includes: injecting molten resin into an injection space between the slot and the core during the heating of the iron core body together with the jig by a heating source in a state where the core is inserted in the slot.

8. The manufacturing method according to claim 1, wherein a coefficient of thermal expansion of the iron core body is larger than a coefficient of thermal expansion of the jig.

* * * * *